H. B. BROWN.
SHAFT COUPLING.
APPLICATION FILED MAY 19, 1920.
1,431,286.
Patented Oct. 10, 1922.
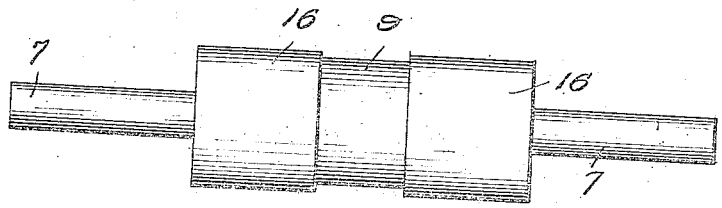
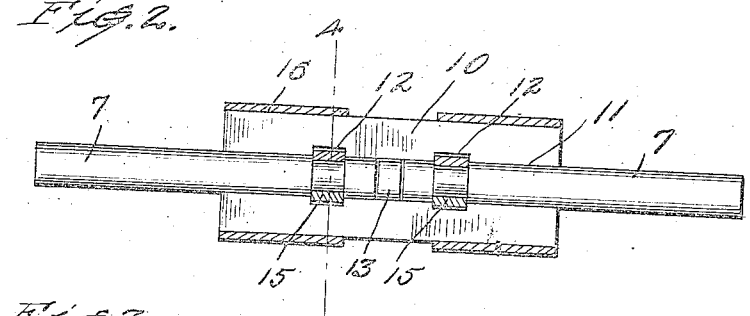
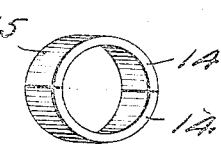
Howard B. Brown
INVENTOR.
BY
Richard B. Owen,
ATTORNEY.

Patented Oct. 10, 1922.

1,431,286

UNITED STATES PATENT OFFICE.

HOWARD B. BROWN, OF OLEAN, NEW YORK.

SHAFT COUPLING.

Application filed May 19, 1920. Serial No. 382,455.

*To all whom it may concern:*

Be it known that I, HOWARD B. BROWN, a citizen of the United States, residing at Olean, in the county of Cattaraugus and State of New York, have invented certain new and useful Improvements in Shaft Couplings, of which the following is a specification.

This invention relates to new and useful improvements in means for uniting a pair of elements and more particularly to a coupling for joining a pair of shaft sections in a manner to prevent accidental dislocation of the sections from the coupling.

Another object of the invention is to provide a device of this nature which permits of rotary movement of both the shaft sections and the coupling upon the sections.

Another object of the invention is to provide a device of the above nature which is strong, durable, inexpensive to manufacture and highly efficient in practice.

Other objects and advantages of this invention will become apparent during the course of the following description.

In the accompanying drawings forming a part of the application and wherein like numerals are employed to designate like parts throughout the several views;

Figure 1 is a side elevation of the invention.

Figure 2 is a longitudinal section through the same.

Figure 3 is an end elevation of the invention as applied.

Figure 4 is a transverse section of the device taken on the line 4—4 of Figure 2.

Figure 5 is a side elevation of the shaft sections and antifriction disk, and

Figure 6 is an enlarged perspective view of the keys for preventing longitudinal movement of the coupling upon the shaft section.

Referring to the drawings, wherein for the purpose of illustration is shown the preferred embodiment of the invention, the numeral 7 designates a pair of shaft sections, each of which is provided adjacent its end with an annular groove 8.

The coupling member designated in its entirety by the numeral 9 consists of a pair of like enclosing members 10, each of which is provided with a semi-circular longitudinally extending recess 11 whereby the enclosing members may fit upon and enclose or embrace the free ends of the shaft sections. A pair of transverse semi-circular grooves 12 are provided in each enclosing member 10 to correspond with the annular grooves 8 in the shaft sections when they are disposed in an assembled position, and these semi-circular grooves communicate with the longitudinal grooves 11 as clearly seen in Figure 2.

When coupling the shaft sections, their ends are brought into contact with an anti-friction disk 13 and an enclosing member 10 is positioned upon these elements. A pair of semi-circular elements 14 when associated provide a ring-like key 15 which is of dimensions to fit within one of the annular grooves 8 of the shaft section and adapted to project beyond the periphery of the shaft section whereby it is also received in one of the transverse grooves 12 in the enclosing member. A ring-like key is associated with each annular groove 8, after which the other enclosing member 10 of the coupling is positioned to enclose the ends of the shaft sections, the anti-friction disk 13 and ring-like keys 15.

In order to retain the two enclosing members together and consequently the parts of the invention in their cooperating relationship, a pair of sleeve elements 16 are slipped over the ends of the enclosing members as shown in the drawing. By providing a coupling in the manner above set forth, it will be seen that the shaft sections may rotate within the coupling while the latter may rotate upon the shaft sections.

The foregoing description and drawing has reference to the preferred or approved embodiment of my invention. It is to be understood however that such changes may be made in construction and arrangement of parts, materials, dimensions, etc., as may prove expedient and fall within the scope of the appended claim.

Having thus fully described my invention what I claim as new and desire to secure by Letters Patent is:—

The combination with a pair of shaft sections, each having an annular groove therein, a pair of semi-circular keys in each groove and projecting beyond the periphery of said shaft sections, a pair of enclosing members having grooves to receive said keys, and means for retaining said members together.

In testimony whereof I affix my signature in presence of two witnesses.

HOWARD B. BROWN.

Witnesses:
WILLIAM HORTON,
CHARLES A. KEENER.